US012488724B2

(12) United States Patent
Chen

(10) Patent No.: US 12,488,724 B2
(45) Date of Patent: Dec. 2, 2025

(54) DISPLAY PANEL, SOURCE DRIVER CHIP, AND ELECTRONIC DEVICE

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Weifeng Chen, Huizhou (CN)

(73) Assignees: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/271,923

(22) PCT Filed: Jun. 14, 2023

(86) PCT No.: PCT/CN2023/100306

§ 371 (c)(1),
(2) Date: Jul. 12, 2023

(87) PCT Pub. No.: WO2024/198102

PCT Pub. Date: Oct. 3, 2024

(65) Prior Publication Data

US 2025/0078714 A1 Mar. 6, 2025

(30) Foreign Application Priority Data

Mar. 30, 2023 (CN) ......................... 202310332339.0

(51) Int. Cl.
*G09G 3/20* (2006.01)

(52) U.S. Cl.
CPC ... *G09G 3/2074* (2013.01); *G09G 2300/0819* (2013.01); *G09G 2300/0842* (2013.01);
(Continued)

(58) Field of Classification Search
CPC ......... G09G 3/2074; G09G 2300/0819; G09G 2300/0842; G09G 2310/027;
(Continued)

(56) References Cited

U.S. PATENT DOCUMENTS

2001/0022570 A1 9/2001 Chang et al.
2013/0120344 A1 5/2013 Liao
2017/0047001 A1* 2/2017 Shin ..................... G09G 3/3275

FOREIGN PATENT DOCUMENTS

CN 102402957 A 4/2012
CN 103151003 A 6/2013
(Continued)

OTHER PUBLICATIONS

PCT International Search Report for International Application No. PCT/CN2023/100306, mailed on Dec. 16, 2023.
(Continued)

*Primary Examiner* — Adam R. Giesy
(74) *Attorney, Agent, or Firm* — The Roy Gross Law Firm, LLC; Roy D. Gross

(57) ABSTRACT

A display panel, a source driver chip, and an electronic device are proposed, which includes a first source driver chip (including a first delay module having a first delay load and electrically connected to a plurality of first sub-pixels) and a second source driver chip (including a second delay module having a second delay load and electrically connected to a plurality of second sub-pixels). The second source driver chip has a first compensation module for compensating for a difference in equivalent resistance between the second delay load and the first delay load.

11 Claims, 3 Drawing Sheets

(52) U.S. Cl.
CPC ... *G09G 2310/027* (2013.01); *G09G 2310/08* (2013.01); *G09G 2320/0233* (2013.01); *G09G 2320/046* (2013.01)

(58) Field of Classification Search
CPC ....... G09G 2310/08; G09G 2320/0233; G09G 2320/046
See application file for complete search history.

(56) References Cited

FOREIGN PATENT DOCUMENTS

| | | | |
|---|---|---|---|
| CN | 111091778 | A | 5/2020 |
| CN | 112669755 | A | 4/2021 |
| CN | 112951158 | A | 6/2021 |
| CN | 113409716 | A | 9/2021 |
| CN | 113707067 | A | 11/2021 |
| CN | 115708148 | A | 2/2023 |
| JP | 2018005200 | A | 1/2018 |
| KR | 20120047538 | A | 5/2012 |

OTHER PUBLICATIONS

PCT Written Opinion of the International Searching Authority for International Application No. PCT/CN2023/100306, mailed on Dec. 16, 2023.

Chinese Office Action issued in corresponding Chinese Patent Application No. 202310332339.0 dated Jul. 15, 2025, pp. 1-9.

* cited by examiner

DISPLAY PANEL, SOURCE DRIVER CHIP, AND ELECTRONIC DEVICE

CROSS REFERENCE TO RELATED APPLICATIONS

This application claims the benefits of International Application No. PCT/CN2023/100306, filed Jun. 14, 2023, which claims priority to Chinese Application No. 202310332339.0, filed on Mar. 30, 2023. The entire disclosures of each of the applications are incorporated herein by reference.

TECHNICAL FIELD

The present application relates to a field of display technology, in particular to the manufacture of a display device, and more particularly, relates to a display panel, a source driver chip, and an electronic device.

BACKGROUND ARTS

Currently, liquid crystal displays are widely-used displays. There are a DLS architecture (left and right adjacent sub-pixels share one data line) and a Tri-gate architecture (the number of gate lines increases by 3 times to realize a reduction of the number of data lines to ⅓) for the liquid crystal displays in consideration of the cost of data driver chips.

Although the afore-mentioned architectures reduce the number of source driver chips by half or more as compared with a 1G1D architecture, the load driven by the source driver chips will be much larger than that of 1G1D. This can be compensated by an Output Data Delay Compensation (ODDC) technique to control the voltage value of all output channels in the source driver chip to be the same after charged. However, for different display areas corresponding to different levels in ODDC, the devices in the ODDC module correspondingly have different connection relations. This causes a difference between equivalent loads, resulting in a difference between the outputs of data signals. As a result, a split-screen problem is caused.

Therefore, the existing display panels utilizing the ODDC technique have the above defects, and it has an urgent need of being improved.

SUMMARY

The objective of the present application is to provide a display panel, a source driver chip and an electronic device, for improving or solving the split-screen problem in the existing display panels utilizing the ODDC technique.

The present application provides a display panel, including:

- a plurality of first sub-pixels;
- a plurality of second sub-pixels;
- a first source driver chip, including a first delay module, wherein the first delay module is electrically connected to the plurality of first sub-pixels and includes a first delay load; and
- a second source driver chip, including a second delay module, wherein the second delay module is electrically connected to the plurality of second sub-pixels and includes a second delay load,
- wherein the second source driver chip further includes a first compensation module electrically connected to the plurality of second sub-pixels and the second delay module, and the first compensation module is configured to compensate for a difference in equivalent resistance between the second delay load and the first delay load according to a parameter of the second delay module and a parameter of the first delay module.

Beneficial Effects

The present application provides a display panel, a source driver chip, and an electronic device, including: a plurality of first sub-pixels; a plurality of second sub-pixels; a first source driver chip, including a first delay module, wherein the first delay module is electrically connected to the plurality of first sub-pixels and includes a first delay load; and a second source driver chip, including a second delay module, wherein the second delay module is electrically connected to the plurality of second sub-pixels and includes a second delay load, wherein the second source driver chip further includes a first compensation module electrically connected to the plurality of second sub-pixels and the second delay module, and the first compensation module is configured to compensate for a difference in equivalent resistance between the second delay load and the first delay load according to a parameter of the second delay module and a parameter of the first delay module, thereby improving uniformity of displayed images, caused by the difference in equivalent resistance between the second delay load and the first delay load.

DESCRIPTION OF DRAWINGS

The present application will be further illustrated below by referring to appended figures. It should be noted that the appended figures described below are only some embodiments used to illustrate the present application, and those of ordinary skill in the art can further obtain other figures according to these figures without making any inventive effort.

EMBODIMENTS OF THE DISCLOSURE

The technical solutions in the embodiments of the present application will be clearly and completely described below with reference to appended figures of the embodiments of the present application. Obviously, the described embodiments are merely a part of embodiments of the present application and are not all of the embodiments. Based on the embodiments of the present application, all the other embodiments obtained by those of ordinary skill in the art without making any inventive effort are within the scope of the present application.

In the description of the present application, the terms "first" and "second" are used for descriptive purposes only and should not be taken to indicate or imply relative importance, or implicitly indicate the indicated number of technical features. Thus, by defining a feature with "first" or "second", it may explicitly or implicitly include one or more features. In addition, it further needs to be explained that the appended figures provide only the structures that are closely related to the present application and omit some details that are less related to the application. The purpose of this is to simplify the appended figures and make the application clear at a glance, instead of making the appended figures exactly same as the actual device. The appended figures should not be construed as a limitation of the actual device.

The term "embodiment" or "implementation" referred to herein means that a particular feature, structure or property described in conjunction with the embodiment may be contained in at least one embodiment of the present application. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

Embodiments of the present application provide a display panel. The display panel may include, but is not limited to, the following embodiments and any combination of the following embodiments.

Figure 1:
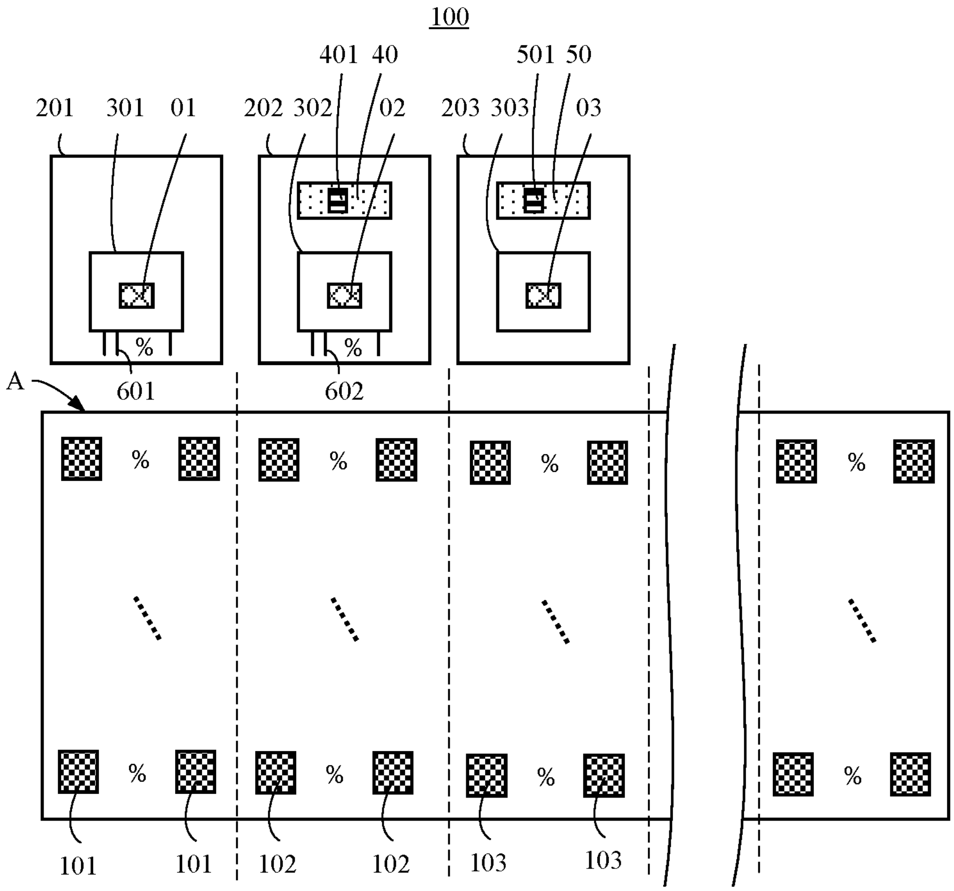
FIG. 1 is a top view of a display panel provided in an embodiment of the present application.

In an embodiment, as shown in FIG. 1, a display panel 100 includes a plurality of first sub-pixels 101; a plurality of second sub-pixels 102; a first source driver chip 201, including a first delay module 301, wherein the first delay module 301 includes a first delay load 01 and is electrically connected to the plurality of first sub-pixels 101; and a second source driver chip 202, including a second delay module 302, wherein the second delay module 302 includes a second delay load 02 and is electrically connected to the plurality of second sub-pixels 102, wherein the second source driver chip 202 further includes a first compensation module 40 electrically connected to the plurality of second sub-pixels 102 and the second delay module 302, and the first compensation module 40 is configured to compensate for a difference in equivalent resistance between the second delay load 02 and the first delay load 01 according to a parameter of the second delay module and a parameter of the first delay module.

A plurality of gate lines and a plurality of data lines may be provided in the display area A. Each gate line may be electrically connected to a plurality of sub-pixels, and each data line may be electrically connected to a plurality of sub-pixels. When one of the gate lines controls a plurality of sub-pixels to be turned on, each data line can load a data voltage transmitted at the time to a turned-on sub-pixel. The plurality of gate lines operate sequentially in a similar fashion, thereby realizing that all the sub-pixels are turned on in turn. Each time a plurality of sub-pixels are turned on, the plurality of data lines are operated as above, thereby realizing light emission of the plurality of sub-pixels, and finally realizing light emission of all the sub-pixels.

Further, as shown in FIG. 1, the display panel 100 may include a plurality of source driver chips located in the non-display area. Each source driver chip may be electrically connected to a plurality of sub-pixels in the display area A, and for a plurality of sub-pixels connected to a same gate line, at least two sub-pixels can be electrically connected to a same source driver chip via corresponding data lines, respectively, to receive at least two corresponding data voltages, respectively. Further, the plurality of source driver chips may at least be electrically connected to a power chip to receive an original data voltage for generating subsequent data voltages. It should be noted that because of at least one of a difference in internal impedance between different source driver chips, an impedance difference between connections of the plurality of sub-pixels with the source driver chips, or an impedance difference between connections of the source driver chips with the power chip, it will cause the sub-pixels connected to different source driver chips to be charged unevenly. Therefore, a corresponding delay module can be set in the source driver chip for delaying the time when signals are outputted by different connections corresponding to different sub-pixels, and differentiated settings are made in the respect of charging time to compensate for the difference in total charging amount caused by the impedance difference.

It should be noted that since the delay module itself also has a corresponding delay load, in compensating for the difference in total charging amount caused by the impedance difference, due to a difference in equivalent resistance between two delay loads corresponding to two delay modules with different delay intervals, it will cause a difference in attenuation of data voltages loaded by two sub-pixels electrically connected to different source driver chips, resulting in ununiformed presentation of displayed images. Specifically, for ease of description, it is illustrated only by using a plurality of sub-pixels arranged in an array along a row direction and a column direction, and a plurality of source driver chips electrically connected to a plurality of sub-pixel groups arranged in a horizontal direction, respectively, that is, it can be considered that a plurality of first sub-pixels 101 and a plurality of second sub-pixels 102 are located in two areas arranged in the display area A along the horizontal direction, respectively. With reference to above description, it can be known that because of the difference in equivalent resistance between the second delay load 02 and the first delay load 01, this cause different attenuation of data voltages loaded to the plurality of first sub-pixels 101 and the plurality of second sub-pixels 102.

Specifically, the first delay module 301 has a first delay interval, the second delay module 302 has a second delay interval, and the first compensation module 40 is configured to compensate for the difference in equivalent resistance between the second delay load 02 and the first delay load 01 according to a difference between the second delay interval and the first delay interval; and/or the first delay module 301 has a first delay level, the second delay module 302 has a second delay level, and the first compensation module 40 is configured to compensate for the difference in equivalent resistance between the second delay load 02 and the first delay load 01 according to a difference between the second delay level and the first delay level. In this embodiment, the former is taken as an example for illustration.

It can be understood that the second source driver chip 202 in this embodiment further includes the first compensation module 40 electrically connected to the plurality of second sub-pixels 102 and the second delay module 302, and the first compensation module 40 is configured to compensate for the difference in equivalent resistance between the second delay load 02 and the first delay load 01 according to a difference between the second delay interval and the first delay interval. While the first delay module 301 and the second delay module 302 compensate for the difference in total charging amount caused by the impedance difference, the first compensation module 40 can also be set to compensate for the difference in equivalent resistance between the second delay load 02 and the first delay load 01, caused by this mechanism, to improve ununiformed presentation of displayed images, caused by the difference in equivalent resistance between the second delay load 02 and the first delay load 01.

In this embodiment, the way how the first compensation module 40 and the second delay module 302 are electrically connected to the plurality of second sub-pixels 102, and the structure of the first compensation module 40, are not limited as long as the first compensation module 40 in the second source driver chip 202 can be used to compensate for the difference in equivalent resistance between the second delay load 02 and the first delay load 01 according to a difference between the second delay interval and the first delay interval. For example, the first compensation module 40 may be directed to, but is not limited to, at least one of voltage source compensation, current source compensation, or load compensation.

In an embodiment, as shown in FIG. 1, the display panel further includes a plurality of first connection lines 601 connected to the first delay module 301, wherein the first delay module 301 is configured to sequentially transmit a plurality of first voltages corresponding to the plurality of first sub-pixels 101 to the plurality of first connection lines 601 at the first delay interval; and a plurality of second connection lines 602 connected to the second delay module 302, wherein the second delay module 302 is configured to sequentially transmit a plurality of second voltages corresponding to the plurality of second sub-pixels 102 to the plurality of second connection lines 602 at the second delay interval. It should be noted that the first voltage and the second voltage here are not two data voltages that are finally applied to the first sub-pixels 101 and the second sub-pixels 102, respectively. Instead, it should be understood that the first delay module 301 and the second delay module 302 output the plurality of first voltages and the plurality of second voltages at the first delay interval and the second delay interval, respectively, and the plurality of first voltages and the plurality of second voltages still need to be processed to form different first data voltages loaded to different first sub-pixels 101 and different second data voltages loaded to different second sub-pixels 102. In this embodiment, the first connection lines 601 and the second connection lines 602 may be understood as connection lines connected to output ends of the first delay module 301 and connection lines connected to output ends of the second delay module 302, respectively, and the signals transmitted by the first connection lines 601 and the second connection lines 602 may be equivalent to the signals outputted by the first delay module 301 and the second delay module 302, respectively.

Figure 2:
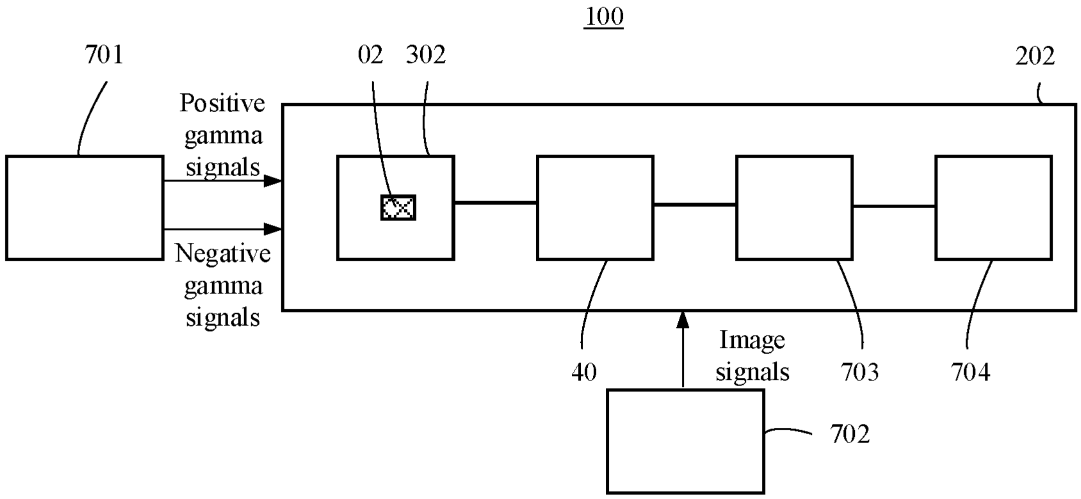
FIG. 2 and FIG. 5 are block diagrams illustrating a display panel provided in an embodiment of the present invention.

Specifically, as shown in FIG. 2, it is illustrated by using an internal structure of the second source driver chip 202 here. The display panel 100 may further include a gamma generating module 701 and a timing control module 702 that are electrically connected to the second source driver chip 202. The gamma generating module 701 and the timing control module 702 transmit gamma signals and image signals to the second source driver chip 202, respectively. In consideration of different types of transistors in the display panel 100, the polarity of turn-on voltages may be different, The gamma signals may include positive gamma signals and negative gamma signals, and the second source driver chip 202 may process the image signals according to the gamma signals to generate a plurality of data voltages loaded to a plurality of sub-pixels, respectively.

Further, withe reference to FIG. 1 and FIG. 2, the second source driver chip 202 may also include a digital-to-analog converting module 703 electrically connected to the first compensation module 40, and a buffer module 704 electrically connected to the digital-to-analog converting module 703 and a plurality of second sub-pixels 102. Further, the second source driver chip 202 may further include a register for receiving clock signals and a multiple-staged latch for receiving the image signals. It can be considered that the gamma signals generated by the gamma generating module 701 is processed sequentially via the second delay module 302 and the first compensation module 40, and the signals obtained after that are transmitted to the digital-to-analog converting module 703. The image signals generated by the timing control module 702 also flow into the digital-to-analog converting module 703 after sequentially passing through the multiple-staged latch. After the signals are processed by the digital-to-analog converting module 703, a plurality of second data voltages corresponding to a plurality of rows of second sub-pixels 102 are generated sequentially, and then the plurality of second data voltages are transmitted sequentially to corresponding rows of second sub-pixels 102 via the buffer.

It should be noted that in this application the second delay module 302 and the first compensation module 40 in the second source driver chip 202 can process at least one of the gamma signals or the image signals and can also process the signals generated from the gamma signals and the image signals as long as the first compensation module 40 corresponds to a second delay module 302 to realize corresponding compensation. According to processing requirements, the second delay module 302 and the first compensation module 40 may be arranged in a path of an appropriate signal flow. In FIG. 2, it is only illustrated a connection pattern that both the second delay module 302 and the first compensation module 40 process the gamma signals, and the first compensation module 40 processes the signals processed by the second delay module 302.

Figure 3:
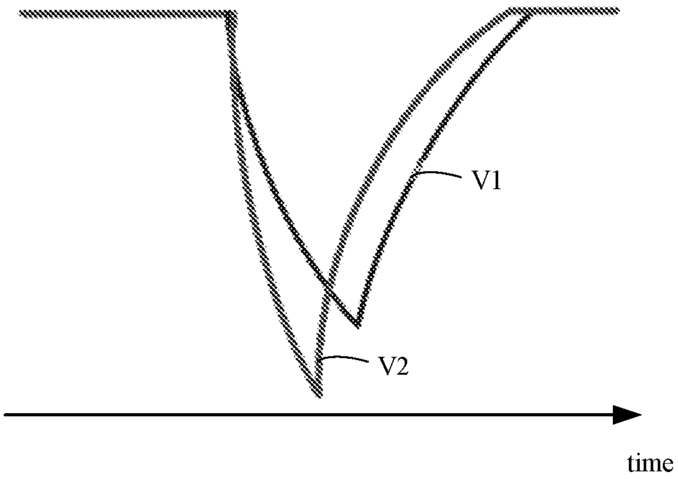
FIG. 3 and FIG. 4 are waveform diagrams of some signals in a display panel provided in an embodiment of the present application.

Specifically, it is assumed that in theory two gamma signals generated by two gamma generating modules 701 with different impedances are the same. However, as shown in FIG. 3, due to a difference in impedance, the two generated gamma signals V1 and V2 are actually different from each other, in which the two amplitudes are different (for example, the amplitude of V1 is less than the amplitude of V2), which means that the impedance corresponding to V1 is greater than the impedance corresponding to V2. Correspondingly, for the output ends of the two gamma generating modules 701, the peak value of V1 will also be later than the peak value of V2.

Figure 4:
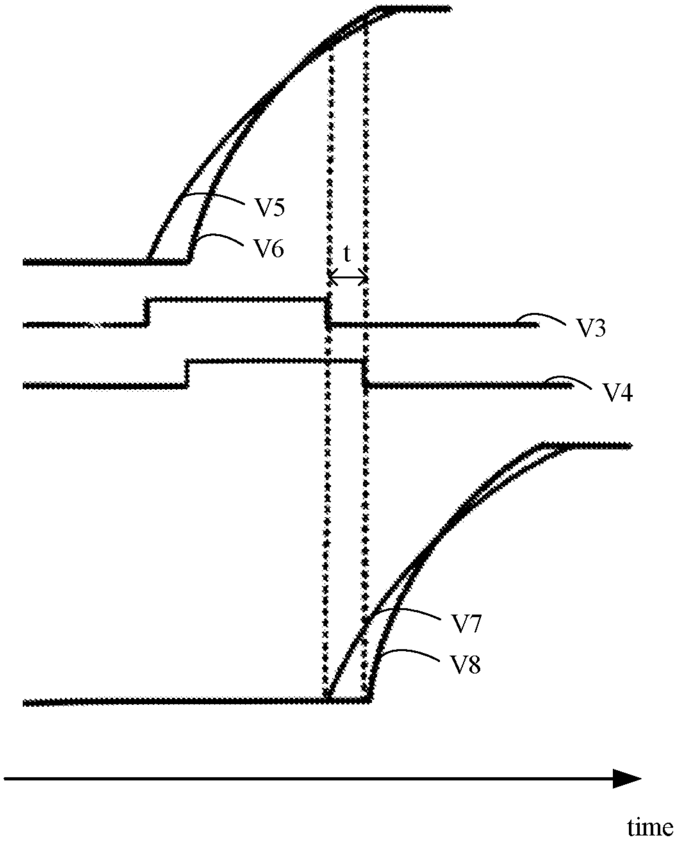

Correspondingly, as shown in FIGS. 4, V3 and V4 may be the signals outputted by the first delay module 301 and the second delay module 302, respectively, that are disposed corresponding to the afore-mentioned two gamma generating modules 701, and a difference between the first delay interval and the second delay interval may be t. Further, it is illustrated herein by using a connection that the first compensation module 40, the digital-to-analog converting module 703, and the buffer module 704 are sequentially connected after the first delay module 301 or the second delay module 302. Since the first compensation module 40 makes a corresponding compensation for the second delay load 02 according to the difference between the second delay interval and the first delay interval, there may only have a delay interval difference t between a signal V5 outputted by the digital-to-analog converting module 703 connected after the first compensation module 40 and a signal V6 outputted by the digital-to-analog converting module 703 corresponding to the first delay module 301, but the amplitudes of the two signals V5 and V6 may be the same. Likewise, there may only have a delay interval difference t between a signal V6 outputted by the buffer module 704 connected after the first compensation module 40 and a signal V8 outputted by the buffer module 704 corresponding to the first delay module 301, but the amplitudes of the two signals V7 and V8 may be the same.

In an embodiment, as shown in FIG. 1, the display panel 100 further includes a plurality of third sub-pixels 103; and a third source driver chip 203, including a third delay module 303 with a third delay interval, wherein the third delay module 303 is electrically connected to the plurality of third sub-pixels 10 and includes a third delay load 03. The third source driver chip 203 further includes a second compensation module 50 electrically connected to the plurality of third sub-pixels 103 and the third delay module 303. The second compensation module 50 is configured to compensate for a difference in equivalent resistance between the third delay load 03 and the first delay load 01 according to a difference between the third delay interval and the first delay interval. An absolute value of a difference between the parameter of the third delay module and the parameter of the first delay module is greater than an absolute value of a difference between the parameter of the second delay module and the parameter of the first delay module, and a compensation value of the second compensation module is greater than a compensation value of the first compensation module.

It can be understood that this embodiment further illustrates that based on the first delay load 01 in the first source driver chip 201, the first compensation module 40 and the second compensation module 50 are set to have two compensation values, respectively, which are used to compensate the second delay load 02 and the third delay load 03, respectively. As a result, it can be considered that the greater the difference from the first delay interval, that is, the greater the difference from the first delay load, the greater the absolute value of the compensation value required to be set.

It should be noted that as mentioned above the gamma signals may include positive gamma signals and negative gamma signals. Based on a same absolute value of the difference yielded between a reference voltage and the positive gamma signal and between the reference voltage and the negative gamma signal, if the voltage values corresponding to the positive gamma signal and the negative gamma signal are all greater than or less than 0, a same compensation module can be adopted to compensate for the positive gamma signal and the negative gamma signal; and if the voltage values corresponding to the positive gamma signal and the negative gamma signal are greater than 0 and less than 0 respectively, "inverters" can be connected before an input end and after an output end of the compensation module used for processing the positive gamma signal as a new compensation module, to realize the compensation for the negative gamma signal. Based on different absolute values of the difference between the reference voltage and the positive gamma signal and between the reference voltage and the negative gamma signal, it is necessary to set two compensation modules with different compensation values for performing corresponding amplitude compensation on the positive gamma signal and the negative gamma signal, respectively.

For example, as shown in FIG. 1, the first compensation module 40 includes a first compensation load 401, and the second compensation module 50 includes a second compensation load 501. An absolute value of a difference between the third delay interval and the first delay interval is greater than an absolute value of a difference between the second delay interval and the first delay interval, and an absolute value of the equivalent resistance of the second compensation load 501 is greater than the absolute value of the equivalent resistance of the first compensation load 401.

It can be understood that with reference to FIG. 1 and FIG. 2, assuming that the framework of this embodiment is adopted and a one-to-one correspondence is established for the number and the position of the plurality of first sub-pixels and the plurality of second sub-pixels, if the first compensation module 40 can "completely compensate" for the difference in equivalent resistance between the second delay load 02 and the first delay load 01 according to the difference between the second delay interval and the first delay interval, then it can be considered that: when the first source driver chip 201 and the second source driver chip 202 load a same image signal and a same gamma signal, a first data voltage loaded by each of the first sub-pixels 101 can be equal to a second data voltage loaded by the second sub-pixel 102 at a corresponding position.

In an embodiment, as shown in FIG. 1, the second delay interval is less than the first delay interval, and the equivalent resistance of the second delay load 02 is less than the equivalent resistance of the first delay load 01. The first compensation module 40 includes a compensation load (i.e., a first compensation load 401), and an absolute value of a difference between a sum of equivalent resistance values of the first compensation load 401 and the second delay load 02 and an equivalent resistance value of the first delay load 01 is less than an absolute value of a difference between the equivalent resistance values of the second delay load 02 and the first delay load 01.

Specifically, based on the above description, the delay module itself also has a corresponding delay load, and here, it can be considered that the smaller the delay interval, the smaller the equivalent resistance of the delay load formed by corresponding circuit connection. In this embodiment, based on a fact that the equivalent resistance of the second delay load 02 is less than the equivalent resistance of the first delay load 01, the first compensation module 40 is set to include the first compensation load 401, that is, for the second source driver chip 202, the first compensation load 401 is superimposed on the second delay load 02 with smaller equivalent resistance, and this can reduce the difference from the first delay load 01, thereby improving uniformity of displayed images, caused by a large difference between the equivalent resistance values of the second delay load 02 and the first delay load 01.

Figure 5:
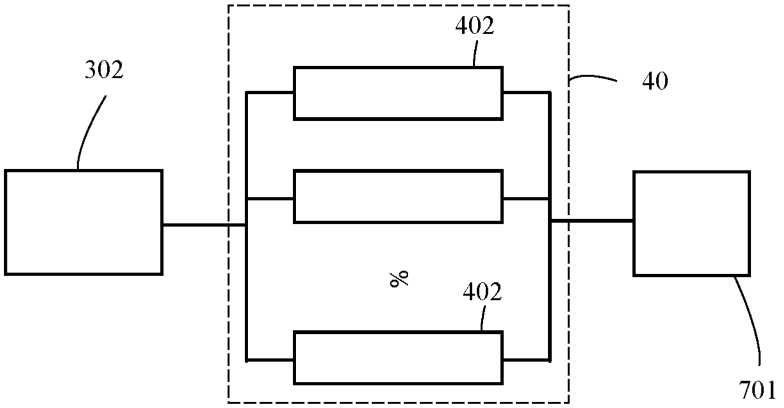

In an embodiment, as shown in FIG. 5, the compensation module 40 includes at least one of a plurality of sub-compensation modules 402 connected in parallel or a plurality of sub-compensation modules 402 connected in series (in FIG. 5, it is illustrated only by the in-parallel connection). Each of the sub-compensation modules 402 includes at least one sub-compensation load 4025, and a plurality of sub-compensation loads 4025 in the plurality of sub-compensation modules 402 constitute the compensation load. Specifically, the plurality of sub-compensation modules 402 can be connected in series or in parallel according to the size requirements of the compensation value and the structure of the compensation module 40 to obtain a compensation load with an equivalent resistance value corresponding to an appropriate compensation value.

Figure 6:
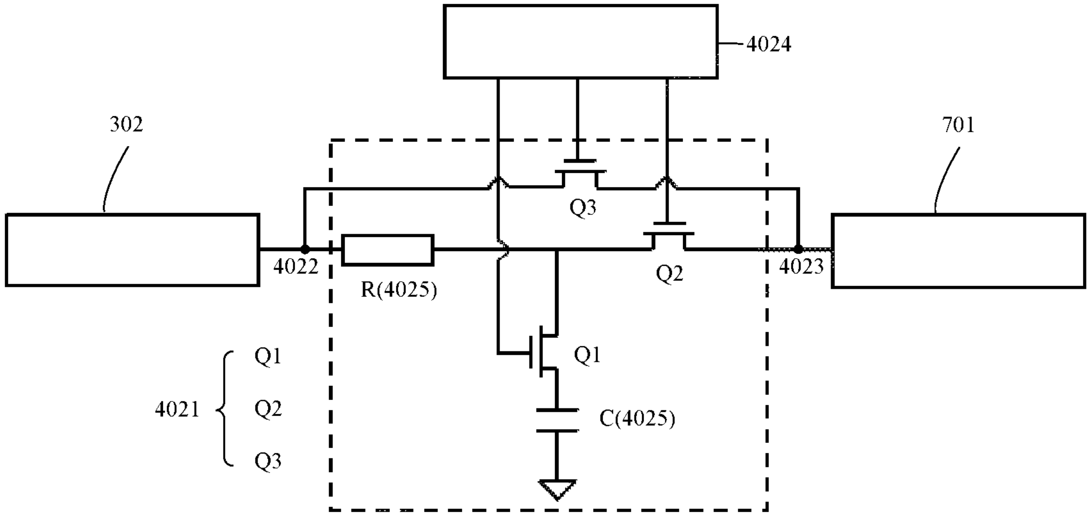
FIG. 6 is a block diagram with a part of circuits for illustrating a display panel provided in an embodiment of the present application.

In an embodiment, with reference to FIG. 1 and FIG. 6, the sub-compensation load 4025 includes at least one of a load resistor R or a load capacitor C, and the load resistor R is connected in series with the second delay module 302, and the load capacitor C is connected to the second delay module 302 and ground. The sub-compensation module 402 further includes a sub-selection module 4021 connected to the sub-compensation load 4025, and the sub-selection module 4021 is configured to control a corresponding sub-compensation load 4025 to be electrically connected to or electrically disconnected from the plurality of second sub-pixels 102. The load capacitor C is connected to the second delay module 302 and the ground; however, it is not limited whether there are other devices arranged between the load capacitor C and the second delay module 302. For example, as shown in FIG. 6, a load resistor R can be arranged therebetween.

The load resistance R has an impedance value, and the load capacitor C has a capacitive reactance value. The afore-mentioned "equivalent resistance" related thereto may represent a total effect of all the impedance values, the capacitive reactance values in the compensation module 40 or the sub-compensation module 402. Specifically, based on a fact that the signals flow from the second delay module 302 to the digital-to-analog converting module 703 herein, the load resistance R is connected in series with the second delay module 302 in this embodiment, and this leads to an attenuation of the signals. Similarly, it can be understood that the load capacitor C that acts on the signals flowing from the second delay module 302 to the digital-to-analog converting module 703 also leads to an attenuation of the signals, and if the signals appear to be like DC signals, the capacitive reactance formed by the load capacitor C will be huge.

It can be understood that the sub-selection module 4021 included in each sub-compensation module 402 provided in this embodiment can control the sub-compensation load to be electrically connected to or electrically disconnected from the plurality of second sub-pixels 102. With reference to FIG. 5 and FIG. 6, it can be determined the number of sub-compensation modules 402 that have sub-compensation loads 4025 (at least one of R or C) actually connected to determine the number of sub-compensation modules 402 that can play a role of compensation, to have a corresponding compensation value.

In an embodiment, with reference to FIG. 1, FIG. 5 and FIG. 6, the sub-compensation module 402 further includes an input end 4022 and an output end 4023, and the sub-selection module 4021 includes a first switch Q1, connected to the load capacitor C and ground; a second switch Q2, connected to the load resistor R and the output end 4023; and a third switch Q3, connected to the input end 4022 and the output end 4023, wherein the sub-compensation module 402 further includes a sub-control module 4024 electrically connected to the first switch Q1, the second switch Q2, and the third switch Q3, and the sub-control module 4024 is configured to control the first switch Q1 and the second switch Q2 to be turned on and control the third switch Q3 to be turned off to electrically connect the sub-compensation load 4025 to the plurality of the second sub-pixels 102 and is configured to control the third switch Q3 to be turned on and control the first switch Q1 and the second switch Q2 to be turned off to electrically disconnect the sub-compensation load 4025 from the plurality of second sub-pixels 102.

It can be considered that the first switch Q1 and the second switch Q2 are configured to control the on-off of branches where the load capacitor C and the load resistor R are located, respectively, and the third switch Q3 is used to control the second delay module 302 and the digital-to-analog converting module 703 to be electrically connected to each other without connecting to any sub-compensation load 4025. Specifically, based on the structures shown in FIG. 1 and FIG. 6, "UI" in the followings can represent a minimum unit of delay, which can be referred to, but is not limited to, the following settings:

if the first delay interval and the second delay interval are 8UI and 2UI respectively, it can be considered that the first delay load 01 corresponding to the first delay interval 8UI does not have to be compensated, and only the second delay load 02 corresponding to the second delay interval 2UI is to be compensated, for example, three sub-control modules 4024 may be used to control corresponding sub-compensation loads 4025 to be electrically connected to the plurality of second sub-pixels 102, that is, the first switch Q1 and the second switch Q2 that correspond to each of the three sub-control modules 4024 are turned on, and a corresponding third switch Q3 is turned off;

if the first delay interval and the second delay interval are 6UI and 2UI respectively, it can be considered that the first delay load 01 corresponding to the first delay interval 6UI does not have to be compensated, and only the second delay load 02 corresponding to the second delay interval 2UI is to be compensated, for example, two sub-control modules 4024 may be used to control corresponding sub-compensation loads 4025 to be electrically connected to the plurality of second sub-pixels 102, that is, the first switch Q1 and the second switch Q2 that correspond to each of the two sub-control modules 4024 are turned on, and a corresponding third switch Q3 is turned off;

if the first delay interval and the second delay interval are 4UI and 2UI respectively, it can be considered that the first delay load 01 corresponding to the first delay interval 4UI does not have to be compensated, and only the second delay load 02 corresponding to the second delay interval 2UI is to be compensated, for example, one sub-control modules 4024 may be used to control corresponding sub-compensation loads 4025 to be electrically connected to the plurality of second sub-pixels 102, that is, the first switch Q1 and the second switch Q2 that correspond to the one sub-control modules 4024 are turned on, and a corresponding third switch Q3 is turned off.

It should be noted that considering that there may still have a source driver chip whose delay interval is greater than the first delay interval, the compensation module can also be arranged in the first source driver chip 201 to perform corresponding compensation. In afore-described three cases, all the sub-control modules 4024 in the first source driver chip 201 may control all the sub-compensation loads 4025 to be electrically disconnected from the plurality of second sub-pixels 102, that is, the first switch Q1 and the second switch Q2 that correspond to each sub-control module 4024 are turned off, and a corresponding third switch Q3 is turned on.

The present application further provides a source driver chip. The source driver chip may include, but is not limited to, the following embodiments and any combination of the following embodiments.

In an embodiment, the source driver chip includes a delay module, having a delay parameter, for electrically connecting to a plurality of sub-pixels of a display panel, and including a delay load; a compensation module, electrically connected to the plurality of sub-pixels and the delay module, wherein the compensation module is configured to compensate for the delay load according to the delay parameter. The structures and functions of the "source driver chip", "delay module", and "compensation module" mentioned in this embodiment may be referred to the afore-mentioned "second source driver chip", "second delay module", and "second compensation module" respectively, but it should be noted that the related description of the "second source driver chip" in above context does not form a limitation to the source driver chip in this embodiment. The source driver chip may be independent from other structures such as the display panel.

The delay parameter may be a delay interval or a delay level. The "delay interval" here may represent a time interval of the delay module with respect to a standard time period. The "standard time period" may represent, for example, the "first delay interval" mentioned above, or it may be preset. Similarly, the "delay level" here may represent a level difference of the delay module with respect to a standard level. The "standard level" may represent, for example, the "first delay level" mentioned above, or it may be preset.

In an embodiment, the compensation module includes a compensation load, including at least one of a load resistor connected in series with the delay module or a load capacitor connected between the delay module and ground; and a selection module, connected to the compensation load, for controlling the compensation load to be electrically connected to or electrically disconnected from the plurality of sub-pixels. Specifically, reference may be made to the descriptions related to FIG. 5 and FIG. 6 above, and the compensation load may be, but is not limited to, the "first compensation load" and "second compensation load" mentioned above.

The present application further provides an electronic device, including the display panel as described above, or the source driver chip as described above.

The present application provides a display panel, a source driver chip, and an electronic device, including: a plurality of first sub-pixels; a plurality of second sub-pixels; a first source driver chip, including a first delay module, wherein the first delay module is electrically connected to the plurality of first sub-pixels and includes a first delay load; and a second source driver chip, including a second delay module, wherein the second delay module is electrically connected to the plurality of second sub-pixels and includes a second delay load, wherein the second source driver chip further includes a first compensation module electrically connected to the plurality of second sub-pixels and the second delay module, and the first compensation module is configured to compensate for a difference in equivalent resistance between the second delay load and the first delay load according to a parameter of the second delay module and a parameter of the first delay module, thereby improving uniformity of displayed images, caused by the difference in equivalent resistance between the second delay load and the first delay load.

Hereinbefore, the display panel, the source driver chip, and the electronic device provided in the embodiments of the present application are introduced in detail, the principles and implementations of the embodiments are set forth herein with reference to specific examples, descriptions of the above embodiments are merely served to assist in understanding the technical solutions and essential ideas of the present application. Those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present application.

The invention claimed is:

1. A display panel, comprising:

a plurality of first sub-pixels;

a plurality of second sub-pixels;

a first source driver chip, comprising a first delay module having a first delay interval and/or a first delay level, wherein the first delay module is electrically connected to the plurality of first sub-pixels and comprises a first delay load; and a second source driver chip, comprising a second delay module having a second delay interval and/or a second delay level, wherein the second delay module is electrically connected to the plurality of second sub-pixels and comprises a second delay load, wherein the second source driver chip further comprises a first compensation module electrically connected to the plurality of second sub-pixels and the second delay module, and the first compensation module is configured to compensate for a difference in equivalent resistance between the second delay load and the first delay load according to a difference between the second delay interval and the first delay interval, and/or according to a difference between the second delay level and the first delay level.

2. The display panel of claim 1, wherein the first delay module has the first delay interval, the second delay module has the second delay interval;

wherein the first delay module is configured to sequentially output a plurality of first voltages corresponding to the plurality of first sub-pixels at the first delay interval, and the second delay module is configured to sequentially output a plurality of second voltages corresponding to the plurality of second sub-pixels at the second delay interval.

3. The display panel of claim 1, wherein the first delay module has the first delay interval, the second delay module has the second delay interval, the second delay interval is less than the first delay interval, and the equivalent resistance of the second delay load is less than the equivalent resistance of the first delay load, wherein the first compensation module comprises a compensation load, and an absolute value of a difference between a sum of equivalent resistance values of the compensation load and the second delay load and an equivalent resistance value of the first delay load is less than an absolute value of a difference between the equivalent resistance values of the second delay load and the first delay load.

4. The display panel of claim 3, wherein the compensation module comprises at least one of a plurality of sub-compensation modules connected in parallel or a plurality of sub-compensation modules connected in series, wherein each of the sub-compensation modules comprises at least one sub- compensation load, and a plurality of sub-compensation loads in the plurality of sub- compensation modules constitute the compensation load.

5. The display panel of claim 4, wherein the sub-compensation load comprises at least one of a load resistor or a load capacitor, and the load resistor is connected in series with the second delay module, and the load capacitor is connected to the second delay module and ground, wherein the sub-compensation module further includes a sub-selection module connected to the sub-compensation load, and the sub-selection module is configured to control a corresponding sub-compensation load to be electrically connected to or electrically disconnected from the plurality of second sub-pixels.

6. The display panel of claim 5, wherein the sub-compensation module comprises an input end and an output end, and the sub-selection module comprises:

a first switch, connected to the load capacitor and ground;

a second switch, connected to the load resistor and the output end; and a third switch, connected to the input end and the output end, wherein the sub-compensation module further comprises a sub-control module electrically connected to the first switch, the second switch, and the third switch, and the sub-control module is configured to control the first switch and the second switch to be turned on and control the third switch to be turned off to electrically connect the sub- compensation load to the plurality of the second sub-pixels and is configured to control the third switch to be turned on and control the first switch and the second switch to be turned off to electrically disconnect the sub-compensation load from the plurality of second sub- pixels.

7. The display panel of claim 1, further comprising:

a plurality of third sub-pixels; and a third source driver chip, comprising a third delay module, wherein the third delay module is electrically connected to the plurality of third sub-pixels and comprises a third delay load, wherein the third source driver chip further comprises a second compensation module electrically connected to the plurality of third sub-pixels and the third delay module, and the second compensation module is configured to compensate for a difference in equivalent resistance between the third delay load and the first delay load according to a parameter of the third delay module and a parameter of the first delay module, wherein an absolute value of a difference between the parameter of the third delay module and the parameter of the first delay module is greater than an absolute value of a difference between the parameter of the second delay module and the parameter of the first delay module, and a compensation value of the second compensation module is greater than a compensation value of the first compensation module.

8. A display panel, comprising:

a plurality of first sub-pixels;

a plurality of second sub-pixels;

a plurality of third sub-pixels;

a first source driver chip, comprising a first delay module, wherein the first delay module is electrically connected to the plurality of first sub-pixels and comprises a first delay load;

a second source driver chip, comprising a second delay module, wherein the second delay module is electrically connected to the plurality of second sub-pixels and comprises a second delay load, and a third source driver chip, comprising a third delay module, wherein the third delay module is electrically connected to the plurality of third sub-pixels and comprises a third delay load, wherein the second source driver chip further comprises a first compensation module electrically connected to the plurality of second sub-pixels and the second delay module, and the first compensation module is configured to compensate for a difference in equivalent resistance between the second delay load and the first delay load according to a parameter of the second delay module and a parameter of the first delay module;

wherein the third source driver chip further comprises a second compensation module electrically connected to the plurality of third sub-pixels and the third delay module, and the second compensation module is configured to compensate for a difference in equivalent resistance between the third delay load and the first delay load according to a parameter of the third delay module and a parameter of the first delay module, wherein an absolute value of a difference between the parameter of the third delay module and the parameter of the first delay module is greater than an absolute value of a difference between the parameter of the second delay module and the parameter of the first delay module, and a compensation value of the second compensation module is greater than a compensation value of the first compensation module.

9. A source driver chip, comprising:

a delay module, having a delay interval and/or a delay level, for electrically connecting to a plurality of sub-pixels of a display panel, and comprising a delay load; and a compensation module, electrically connected to the plurality of sub-pixels and the delay module, wherein the compensation module is configured to compensate for the delay load according to the delay interval and/or the delay level.

10. The source driver chip of claim 9, wherein the compensation module comprises:

a compensation load, comprising at least one of a load resistor connected in series with the delay module or a load capacitor connected between the delay module and ground; and a selection module, connected to the compensation load, for controlling the compensation load to be electrically connected to or electrically disconnected from the plurality of sub-pixels.

11. An electronic device, comprising the display panel as claimed in claim 1.

* * * * *